United States Patent [19]

Huston

[11] Patent Number: 4,629,372

[45] Date of Patent: Dec. 16, 1986

[54] CHIP-CONTROLLING INSERT

[75] Inventor: Mark F. Huston, Canal Fulton, Ohio

[73] Assignee: Manchester Tool Company, Akron, Ohio

[21] Appl. No.: 731,325

[22] Filed: May 3, 1985

Related U.S. Application Data

[63] Continuation of Ser. No. 503,458, Jun. 13, 1983, abandoned, which is a continuation of Ser. No. 230,229, Feb. 2, 1981, abandoned.

[51] Int. Cl.⁴ .......................... B23B 27/22; B26D 1/00
[52] U.S. Cl. ...................................... 407/116; 407/117
[58] Field of Search ................. 407/114-117, 407/120

[56] References Cited

U.S. PATENT DOCUMENTS

| D. 275,760 | 10/1984 | Cochran . | |
| 1,299,125 | 4/1919 | Carter | 407/120 |
| 2,164,303 | 7/1939 | Berg et al. . | |
| 2,176,265 | 10/1939 | Luers | 407/117 |
| 2,256,847 | 9/1941 | Osenberg . | |
| 2,424,473 | 7/1947 | Luers . | |
| 2,641,048 | 6/1953 | Vreeland | 407/116 |
| 2,688,791 | 9/1954 | Luers et al. | 407/117 |
| 2,891,300 | 6/1959 | Shephard | 407/117 |
| 3,175,276 | 3/1965 | Weber et al. | 407/113 |
| 3,364,544 | 1/1968 | Urbanic | 407/117 |
| 3,654,681 | 4/1972 | Stein . | |
| 3,815,191 | 6/1974 | Holma . | |
| 3,909,896 | 10/1975 | Krozal | 407/116 |
| 3,947,937 | 4/1976 | Hertel | 407/116 |
| 3,973,308 | 8/1976 | Lundgren . | |
| 4,337,562 | 7/1982 | Flueckicer | 407/120 |

FOREIGN PATENT DOCUMENTS

| 397745 | 7/1941 | Canada . | |
| 5128155 | 5/1955 | Canada . | |
| 1010640 | 5/1977 | Canada . | |
| 426244 | 3/1926 | Fed. Rep. of Germany | 407/120 |
| 494265 | 3/1930 | Fed. Rep. of Germany . | |
| 1070898 | 12/1959 | Fed. Rep. of Germany | 407/115 |
| 879235 | 2/1943 | France | 407/115 |
| 25982 | 3/1978 | Japan | 407/120 |
| 38755 | 11/1979 | Japan | 407/119 |

OTHER PUBLICATIONS

Manchester carbide cutoff tools, Form No. 329J, May, 1981.
Manchester carbide tooling systems, Form No. 319J.
Manchester face grooving and trepanning tools, Form No. 330F, Nov. 1981.
Manchester stocksaver carbide inserts, Form No. 326G, May, 1981.

Primary Examiner—Lowell A. Larson
Assistant Examiner—Jerry Kearns
Attorney, Agent, or Firm—Watts, Hoffmann, Fisher & Heinke

[57] ABSTRACT

A metal-cutting insert (10) having a cutting edge (31) and an associated chip control surface (52). Chip configuration control is effected by means of a cutting edge formed with a transverse rake face (52) extending to the top (64) of the insert above and behind the cutting edge (31) and a rearward extending channel (50) that penetrates both the top of the insert (64) and the shelf type cutting edge (31). Additional transverse shelves (62) are formed at spaced apart locations behind the cutting edge (31). The insert (10) can be ground back to the next rearward disposed shelf (62) forming a new cutting edge with an associated chip control configuration. The rake face (52) associated with a cutting edge (31) of the insert can be coated with a suitable material such as titanium nitride. The insert (10) after grinding will still have a coated rake face associated with the new cutting edge.

12 Claims, 19 Drawing Figures

CHIP-CONTROLLING INSERT

This application is a continuation of Ser. No. 503,458, filed June 13, 1983, now abandoned, which is a continuation of Ser. No. 230,229, filed Feb. 2, 1981, now abandoned.

BACKGROUND OF THE INVENTION

1. Technical Field

This invention relates to metal working and more particularly to a chip-controlling metal cutting insert.

2. Background Art

Metal cutting inserts having chip controlling shapes are known in the art. U.S. Pat. No. 3,654,681 discloses a metal cutoff tool characterized by the fact that the cutting portion thereof is provided with a chip breaker surface that includes opposed chamfer surfaces located rearwardly of the cutting edge that assist in providing clearance for chip removal purposes U.S. Pat. No. 3,815,191 teaches a chip forming insert which imparts to the chip a longitudinally extending bulge or thickened portion which stiffens the chip and modifies its form. U.S. Pat. No. 3,973,308 teaches a cutting tool which has several depressions or notches separated from each other and situated inside and spaced from the cutting edge. U.S. Pat. No. 2,164,303 teaches a metal cutting tool having grooves extending from nicks in the cutting edge.

DISCLOSURE OF THE INVENTION

The present invention provides a chip controlling metal cutting insert having a first cutting edge with an associated chip controlling surface for causing chips to form in a desired configuration. In the embodiment shown, one or more additional chip controlling surfaces are disposed behind the first chip controlling surface but are positioned to be shielded from chip engagement until the preceding chip forming surface is ground away to define a new cutting edge.

The disclosed insert will provide chip control over a wide range of speeds, feeds, and materials and due to its repetitive shape will be regrindable. If a coating is applied to the insert each chip configuring surface will still have an associated coated rake face after regrinding.

The disclosed chip conforming insert can be used as a cutoff tool. A channel in the top of the insert centered in its width and extending along its longitudinal axis is provided. Multiple transverse grooves, not as deep as the longitudinal channel, can be provided at spaced apart locations, along the channel length. A cutting edge is formed at the front of the insert, beneath the top rake surface but above the channel bottom. A shelf shaped surface extends from the cutting edge to a top surface of the insert. The channel acts to narrow the chips while the rear of the shelf curls the chips to a point of breaking them into desired small shapes. Different dimensions and shapes of the channel and rearward extending shelf surfaces can be provided for good chip control over a wide range of speed and feed conditions. The insert in the embodiment shown can be ground back to the next transverse groove to provide a new cutting edge without destroying the desired chip controlling geometry. The bottom of the remaining portion of the transverse groove will be contiguous with the new cutting edge. Depending on how much of the groove is removed, the cutting edge can be given a positive, negative, or neutral rake face angle. The channel and shelf arrangement for the cutting edge can remain the same when the insert is reground back the proper selected distance. Alternatively, the channel and shelf arrangement for the cutting edge can be varied as to depth, width and form of successive cutting edges.

It is an object of this invention to teach a chip controlling insert or tool. It is also an object of this invention to teach a metal cutting insert having a plurality of spaced apart chip configuring surfaces which are exposed when the insert is ground back a selected distance to define a new cutting edge.

Broadly, the present invention provides an improved cutoff tool insert that has a cutting edge at one end of an elongated body, a top portion above and behind the cutting edge, a chip-forming shelf extending rearward and upward from the cutting edge to the top surface, and a channel extending through the cutting edge, the chip-forming shelf and at least a portion of the top surface. The channel is substantially narrower than the cutting edge and is located centrally thereof with respect to the width of the insert.

BRIEF DESCRIPTION OF THE DRAWINGS

For a better understanding of the invention, reference may be had to the preferred embodiment exemplary of the invention shown in the accompanying drawings in which.

BEST MODE FOR CARRYING OUT THE INVENTION

Figure 1:
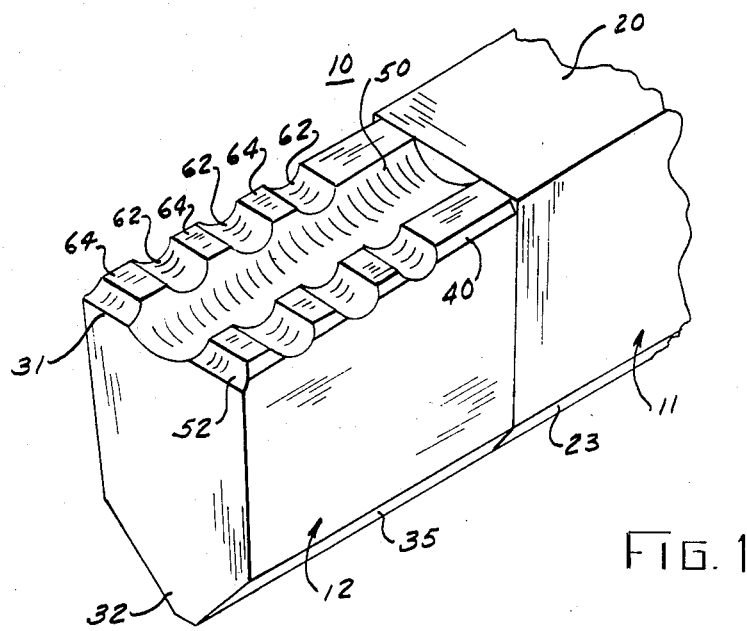
FIG. 1 is an enlarged perspective view of a portion of a cutoff insert constructed according to the teaching of the present invention.
Figure 2:
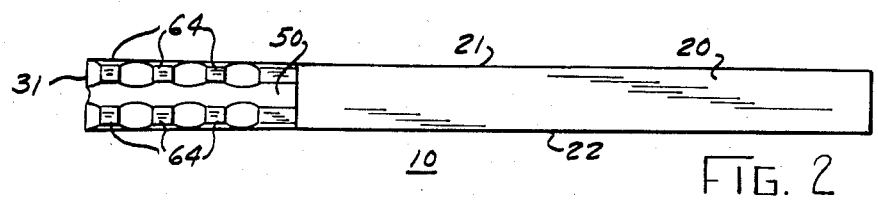
FIG. 2 is a top plan view of an insert constructed according to the teaching of the present invention.

Referring now to the drawings, there is shown a metal cutoff insert 10 constructed according to the teaching of the present invention. Insert 10 includes a shank or body portion 11 and a tip portion 12. The shank 11 and tip 12 are arranged coextensively to define an overall insert 10 of an elongated configuration. The shank 11 includes a top surface 20, opposed side surfaces 21 and 22, and a truncated V-shaped bottom surface 23, with the arrangement of these parts being similar to the arrangement shown in connection with Novkov, U.S. Pat. No. 2,964,833 whose teachings are herein incorporated by reference.

Carbide tip 12 includes a transversely extending cutting edge 31 that is defined by the top of a forward face 32. Tip 12 includes a V-shaped bottom surface 35 and opposed side walls 36 and 37. The side walls 36 and 37 are preferably ground so as to provide the requisite degree of side and back clearance in the manner well known in the prior art. Tip 12 is fused in a known manner to the forward end of the shank 11 by brazing or other known metal joining techniques. Chamfers 40 and 41 are provided at the joint of juncture between the top surface 64 and the opposed side surfaces 36 and 37. The effect and purpose of the chamfers 40 and 41 is fully described in Stein U.S. Pat. No. 3,654,681 whose teachings are herein incorporated by reference.

Tip 12 includes a longitudinal groove or channel 50 extending rearward from cutting edge 31. A curved shelf shaped rake portion 52 is provided extending rearward and upward from cutting edge 31 to a top surface 64. Longitudinal channel 50 extends through the cutting edge 31 and the shaped rake portion 52. Channel 50 may extend through the entire length of tip 12, but need not do so.

During a metal cutting operation, longitudinal channel 50 acts to narrow a chip while the curved shelf portion 52 curls the chip to the point of breaking into clockspring or figure-nine shapes which are well known in this art. Dimensions of the channel 50 and shaped rake portion 52, and radii on the rear of the shaped rake portion 52, can all be varied to provide good chip control over a wide range of speed and feed conditions. In use, the illustrated chip controlling geometry has provided good chip control.

In the embodiment shown, a succession of transverse grooves 62 are provided across cutting tip 12. Grooves 62 are not as deep as the longitudinal channel 50 and are preferably perpendicular to and spaced along the length of tip 12. After a period of metal cutting as the cutting edge 31 becomes worn the tip 12 can be reground back to the next successive groove 62 to provide a new cutting edge 31 having associated therewith a shaped chip controlling surface which is very similar or identical to the chip controlling shape with the original cutting edge. Tip 12 narrows slightly as it extends rearward. Thus, each new ground cutting edge will be slightly narrower than the preceding cutting edge.

For high speed steel cut off blades, the blade need not be narrowed or be tapered as it extends rearward from the cutting edge. If these parallel blades are formed with a regrindable chip control geometry, as disclosed, the cutting edge will remain the same width even after being reground. This characteristic of no change in width after regrind would be beneficial on multiple spindle automatic machines where part length is determined by the location of the cutoff tool and the width of the cutting edge must remain the same.

In the cutting tool illustrated in FIG. 1 the tip can be reground three times. When tip 12 is ground back the proper selected distance a new cutting edge 31 is defined and the portion of groove 62 remaining forms a new surface similar to 52 and provides chip control as explained above. For an insert having a cutting edge width of 0.188 inches (4.8 mm), a groove 62 width of 0.060 inches (1.5 mm) and depth of 0.012 inches (0.3 mm) and channel 50 width of 0.075 inches (1.9 mm) and depth of 0.020 inches (0.51 mm) have been found to work well.

Figure 3:
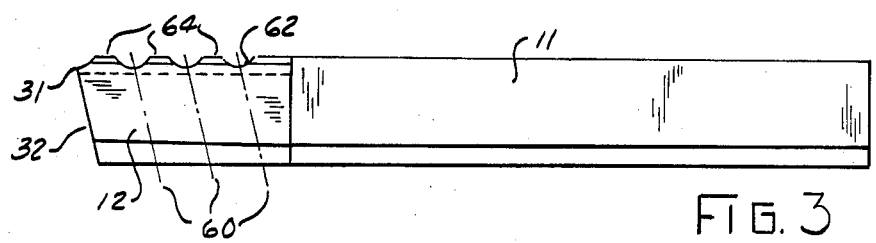
FIG. 3 is a side elevation view of the insert shown in FIG. 2.
Figure 4:
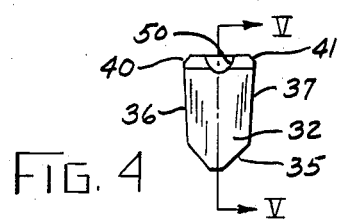
FIG. 4 is a front view of the insert shown in FIG. 2.
Figure 5:
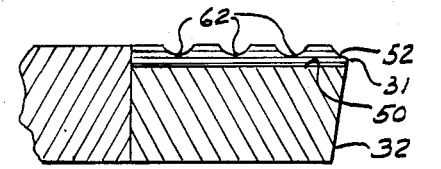
FIG. 5 is a section view of the insert shown in FIG. 4 taken along the line V—V.
Figure 6:
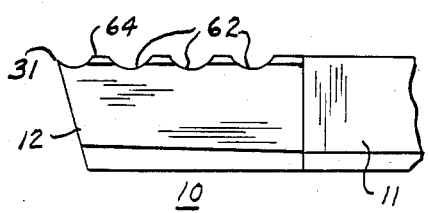
FIG. 6 is a side elevation view of an insert, as shown in FIG. 1, ground to provide a positive rake angle.
Figure 7:
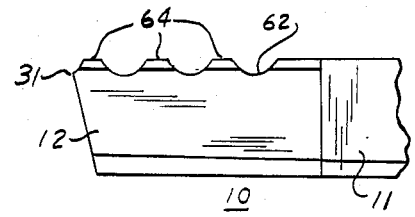
FIG. 7 is a side elevation of an insert, as shown in FIG. 1, ground to provide a negative rake angle.

Referring now to FIG. 3, dashed lines 60 indicate the lines to which tip 12 is ground to provide new cutting edges having associated substantially identical chip controlling surfaces. However, tip 12 can be ground back either a little to the right or left of line 60, as shown in FIG. 3, to provide a cutting edge with a different rake angle. If desired, lines 60 can be physically marked on cutting tip 12 by a known method such as laser etching, electroetching, grinding, or the like. If lines are physically formed on tip 12 this could greatly facilitate regrinding. The insert shown in FIG. 3 has a neutral rake angle, and if it is ground back to line 60 the new cutting edge will also have a neutral rake angle. If, however, tip 12 is ground back to provide a cutting edge 31, as shown in FIG. 6, slightly to the left of FIG. 3 line 60, but still within groove 62, a positive rake angle will be provided. On the other hand, if tip 12 is ground back to provide a cutting edge 31, as shown in FIG. 7, slightly to the right of FIG. 3 line 60, but still within groove 62 a negative rake angle will be provided.

Figure 8:
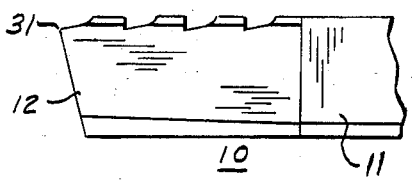
FIG. 8 is a side elevation view of an insert with grooves which will provide a negative rake angle over their width.
Figure 9:
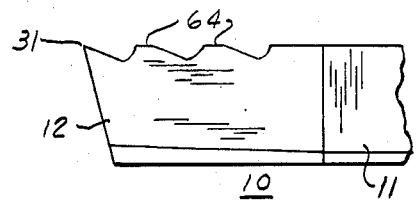
FIG. 9 is a side elevation view of an insert with grooves which will provide a positive rake angle over their width.

It should also be understood that while groove 62 is shown with a semi-circle configuration, numerous other configurations can be provided. For example, as shown in FIG. 8, the front of the cross groove can drop sharply, then slant up to the top 64 of insert 10. This construction would provide a groove having a negative rake over most of its width. Alternatively, as shown in FIG. 9, the cross groove could slope downward from the top 64 and blend into a rear wall which curves up to the top 64. This construction would provide a groove having a positive rake over its width. Of course, various other groove shapes can be provided, and also the groove shapes provided on a single insert can be individually different.

The tip 12 can be coated with a desired coating such as titanium nitride, titanium carbide, or aluminum oxide. The desired coating is preferably applied after the desired shapes are formed in the top of tip 12. Thus, after each regrind each new chip controlling surface will still have associated therewith a coated rake face.

During use, only the chip controlling surface 52 associated with the cutting edge 31 will be exposed to direct chip engagement. That is, the successive recessed grooves 62 will not be exposed to direct chip contact until tip 12 is ground back to define a new cutting edge extending through the associated groove 62. While in the preferred embodiment the cutting edge 31 extends at 90 degrees to the longitudinal axis of tool 10 and groove 62 extends at 90 degrees to the centerline, and the longitudinal channel extends parallel to the centerline, there may be instances when other configurations are more desirable. The teaching of the invention can still be practiced if grooves 62 are not at 90 degrees to the centerline, if the cutting edge is not at 90 degrees to the centerline, if grooves 62 are not parallel or of the same shape, or if the longitudinal channel 50 is not parallel to the centerline of insert 11. Further, it is not necessary that channel 50 be continuous or that groove 62 or channel 50 be of uniform cross section or exactly central to edge 31.

Figure 10:
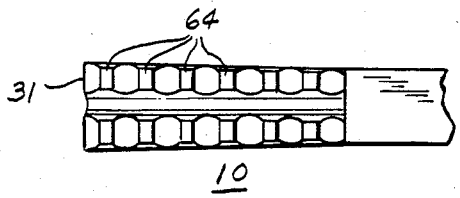
FIG. 10 is a top view of a cutoff insert wherein the top of the tip portion is higher than the top of the shank portion.
Figure 11:
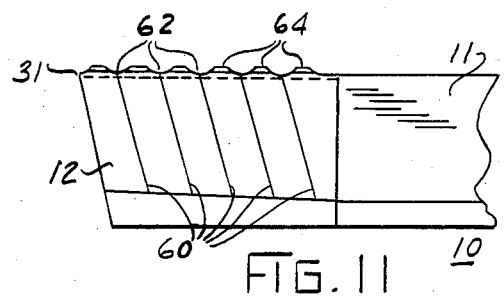
FIG. 11 is a side view of the insert shown in FIG. 10.
Figure 12:
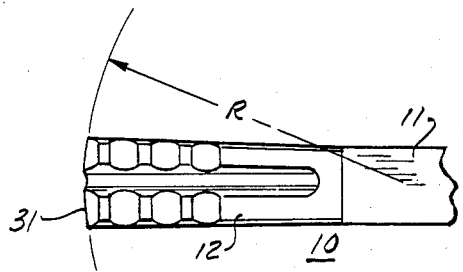
FIG. 12 is a top view of a cutoff insert wherein the cutting edge is formed on a radius.
Figure 13:
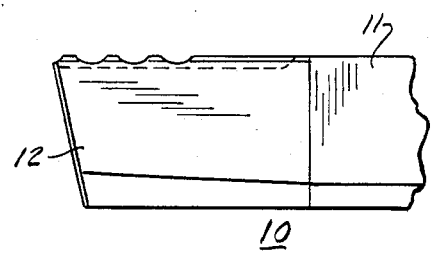
FIG. 13 is a side view of the insert shown in FIG. 12.
Figure 14:
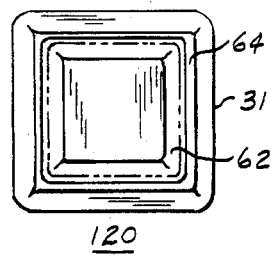
FIG. 14 is a plan view of a turning insert according to the present invention.
Figure 15:
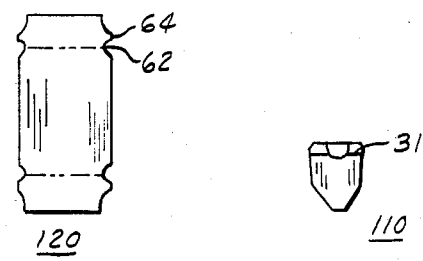
FIG. 15 is a view of the insert of FIG. 14 along the line XV—XV.
Figure 19:
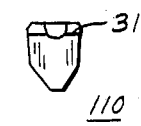
FIG. 19 is a front view of the insert shown in FIG. 18.
Figure 16:
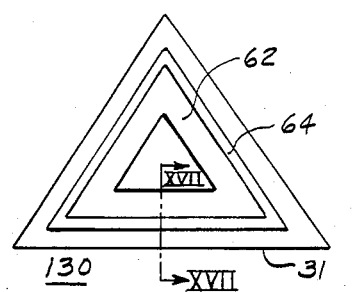
FIG. 16 is a plan view of another embodiment of a turning insert according to the invention.
Figure 17:
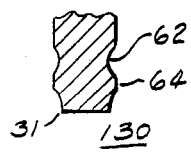
FIG. 17 is a view of the insert of FIG. 16 along the line XVII—XVII.
Figure 18:
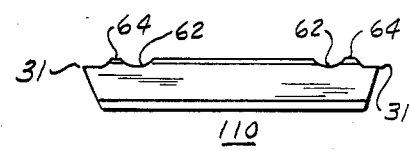
FIG. 18 is a side view of a double ended insert.

FIGS. 10 and 11 shown an embodiment of cutoff insert 10 wherein the top of tip 12 is higher than the top of shank 11. FIGS. 12 and 13 shown an embodiment of cutoff insert 10 wherein the front cutting edge is formed along a selected radius, R. FIGS. 18 and 19 show a double ended cutoff insert 110.

The disclosed cutoff insert 10 provides good chip control over a wide range of speeds, feeds, and materials. Cutoff insert 10 is also regrindable a number of times, depending on the number of transverse grooves 62 provided in tip 12. The teaching of this invention, while generally explained in terms of a cutoff insert 10 are not limited thereto, but are applicable to a wide range of cutting tools and inserts. When the terms insert or tool are used in the specification or claims, it is intended that they be construed to mean both inserts and tools. FIGS. 14 and 15 and FIGS. 16 and 17 show turning inserts 120 and 130 respectively, constructed according to the present invention.

I claim:

1. A cutoff tool comprising:
   an elongated body portion;
   a carbide tip at the front of said elongated body portion;
   a top surface formed on said tip;
   said top surface of said tip having a channel located in a central longitudinal plane of the elongated body portion;
   a chip-forming shelf in said tip extending the full width of said tip from said top surface forward and downward to a depth above the bottom of said channel and defining with said channel a first cutting edge, said channel extending the full extent of the shelf in the longitudinal direction of the elongated body portion;
   a front surface formed on said tip extending downward and rearward from said first cutting edge;
   a pair of side walls extending rearward from said front surface and converging in a direction away from said top surface; and
   a generally V-shaped bottom extending downward from said pair of side walls and rearward from said front surface.

2. A cutoff tool as claimed in claim 1 comprising:
   a plurality of cross grooves, of a depth less than said channel, extending perpendicular to said channel and completely across said top surface.

3. A cutoff tool as claimed in claim 1 comprising:
   chamfers formed at the juncture between said top surface and said pair of side walls.

4. A cutoff tool as claimed in claim 1 wherein said first cutting edge is formed with:
   a concave middle segment; and,
   a pair of straight segments axially aligned and extending from said concave middle segment.

5. A cutoff tool as claimed in claim 4 comprising:
   a plurality of cross grooves of a depth less than said channels and extending perpendicular to said channels and completely across said top surface to define a cutting edge of the same shape as said first cutting edge when a selected amount of said tip is removed.

6. A cutoff insert comprising:
   a cutting edge;
   a top;
   a curved rake surface extending from the cutting edge to said top; and
   said rake surface waving a channel, substantially narrower than the cutting edge, intersecting said top add said cutting edge, forming a central notch in said cutting edge.

7. An improved insert for a cutoff tool comprising:
   an elongated body portion;
   a cutting edge at one end of the body portion;
   a top portion including a top surface disposed above and back from said cutting edge;
   a chip forming shelf extending rearward and upward from said cutting edge to said top surface; and
   said having a channel extending through said cutting edge, said chip forming shelf and at least a portion of said top surface, said channel being substantially narrower than and located centrally of said cutting edge.

8. An insert as claimed in claim 7 comprising:
   a second cutting edge, shelf and channel substantially identical to the first at an opposite end of said elongated body portion.

9. An insert as claimed in claim 7 further including:
   a cross groove in said top surface behind said chip forming shelf, shallower than said longitudinal channel, extending parallel to said chip forming shelf and intersecting the channel.

10. An improved cutoff tool insert comprising:
    a top surface;
    a cutting edge disposed forward and beneath said top surface;
    a chip-forming surface extending from said cutting edge upward to said top surface;
    a front surface extending downward from said cutting edge;
    opposed side walls extending rearward from the edges of said front surface and converging downward with respect to said top surface;
    a generally V-shaped bottom extending rearward from said front surface and upward toward said opposed side walls; and
    said chip forming surface having a longitudinal channel, substantially narrower than and located centrally of the cutting edge, extending through said cutting edge and at least into said top surface.

11. An improved cutoff tool insert as claimed in claim 10 comprising:
    an elongated body portion having said cutting structure formed at one end thereof and another cutting structure formed at the other end thereof which is substantially a mirror image of said cutting structure.

12. An improved cutoff insert as claimed in claim 10 comprising:
    a cross groove, shallower than said longitudinal channel, extending across said top surface and disposed rearward from said chip forming surface.

* * * * *

UNITED STATES PATENT AND TRADEMARK OFFICE
CERTIFICATE OF CORRECTION

PATENT NO. : 4,629,372
DATED : December 16, 1986
INVENTOR(S) : Mark F. Huston

It is certified that error appears in the above—identified patent and that said Letters Patent is hereby corrected as shown below:

Column 5, line 56 (claim 4), "1" should be -- 3 --.

Column 6, line 9 (claim 6), "waving" should be -- having --;
line 11, "add" should be -- and --;
line 16 (claim 7), after "portion" insert a comma (,);
line 20, after "said" (first occurrence) insert -- body portion --.

Signed and Sealed this

Tenth Day of November, 1987

Attest:

DONALD J. QUIGG

Attesting Officer

Commissioner of Patents and Trademarks